United States Patent
Cao et al.

(10) Patent No.: US 9,934,437 B1
(45) Date of Patent: Apr. 3, 2018

(54) SYSTEM AND METHOD FOR REAL-TIME COLLISION DETECTION

(71) Applicant: HRL Laboratories, LLC, Malibu, CA (US)

(72) Inventors: Yongqiang Cao, Newton, MA (US); Deepak Khosla, Camarillo, CA (US); Yang Chen, Westlake Village, CA (US); David J. Huber, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 299 days.

(21) Appl. No.: 14/795,884

(22) Filed: Jul. 9, 2015

Related U.S. Application Data

(63) Continuation-in-part of application No. 14/680,057, filed on Apr. 6, 2015.

(51) Int. Cl.
*G06K 9/00* (2006.01)
*G06T 7/20* (2017.01)

(52) U.S. Cl.
CPC ........ *G06K 9/00624* (2013.01); *G06T 7/2006* (2013.01); *G06T 2207/10004* (2013.01); *G06T 2207/30252* (2013.01)

(58) Field of Classification Search
None
See application file for complete search history.

(56) References Cited

U.S. PATENT DOCUMENTS

| 7,266,477 | B2* | 9/2007 | Foessel | G01S 13/723 340/436 |
| 8,160,354 | B2 | 4/2012 | Paquier | |
| 2003/0002731 | A1 | 1/2003 | Wersing | |
| 2006/0126918 | A1* | 6/2006 | Oohashi | G05D 1/0251 382/153 |
| 2008/0201282 | A1 | 8/2008 | Garcia | |
| 2010/0305857 | A1* | 12/2010 | Byrne | G06T 7/73 701/301 |
| 2011/0133917 | A1* | 6/2011 | Zeng | G06K 9/6293 340/436 |

(Continued)

OTHER PUBLICATIONS

A biologically inspired analog IC for visual collision detection, Reid R. Harrison, IEEE, 1057-7122, 2005, pp. 2308- 2318.*

(Continued)

*Primary Examiner* — Jayesh A Patel
(74) *Attorney, Agent, or Firm* — Tope-McKay & Associates

(57) ABSTRACT

Described is a system for collision detection. The system divides an image in a sequence of images into multiple sub-fields comprising complementary visual sub-fields. For each visual sub-field, motion is detected in a direction corresponding to the visual sub-field using a spiking Reichardt detector with a spiking neural network. Motion in a direction complementary to the visual sub-field is also detected using the spiking Reichardt detector. Outputs of the spiking Reichardt detector, comprising data corresponding to one direction of movement from two complementary visual sub-fields, are processed using a movement detector. Based on the output of the movement detector, an impending collision is signaled.

14 Claims, 19 Drawing Sheets

(56) References Cited

U.S. PATENT DOCUMENTS

2015/0269485 A1  9/2015  Julian

OTHER PUBLICATIONS

Elaborated motion detector based—model, Mihai-Emanuel Basch et al, Jan. 2010, pp. 192-195.*
A biologically inspired analog 1C for visual collision detection, Reid R. Harrison, IEEE, 1057-7122, 2005, pp. 2308- 2318.*
Elaborated Reichardt detectors, Jan P.H. van Santen et al., 0740-3232, 1985, pp. 300-321.*
Reactive direction control—integrated, Shigang Yue et al., Springer, 2009, pp. 151-167.*
Locust's Looming Detectors for Robot Sensors, F. Claire Rind et al. Springer, 2003, pp. 237-250.*
The locust DCMD—Trajectories, Sarah J. Judge et al., The journal of accepted biology 200, 1997, pp. 2209-2216.*
Hassenstein, B., and Reichardt, W. (1956). Systemtheoretische Analyse der Zeit-, Reihenfolgen- und Vorzeichenauswertung bei der Bewegungsperzeption des Riisselkiifers Chlorophanus. Z. Naturforsch IIb, pp. 513-524.
Reichardt, W. (1961). Autocorrelation, a principle for the evaluation of sensory information by the central nervous system. In Sensory Communication, W.A. Rosenblith, ed. (New York, London: MIT Press and Wiley), pp. 303-317.
Haag, J., Denk, W., & Borst, A. (2004). Fly motion vision is based on Reichardt detectors regardless of the signal-to-noise ratio. Proceedings of the National Academy of Sciences of the United States of America, 101(46), pp. 16333-16338.
Reid R. Harrison and Christof Koch (1998) An Analog VLSI Model of the Fly Elementary Motion Detector. In Advances in Neural Information Processing Systems 10, M. I. Jordan, M. J. Kearns, S. A. Solia, eds. MIT Press, Cambridge, MA. pp. 880-886.
Energy-Efficient Neuron, Synapse and STDP Integrated Circiuts, Jose M. Cruz-Albrecht, Michael W. Yung, Narayan Srinivasa, IEEE Trans. Biomed. Circuits Sys., vol. 6, No. 3, Jun. 2012, pp. 246-256.
Energy Efficiency of FPGAs and Programmable Processors for Matrix Multiplication, Scrofano, Choi and Prasanna. Proceedings Field-Programmable Technology, 2002. (FPT). pp. 422-425.
Badia, S.B.I., Pyk, P., & Verschure, P. F. (2007). A fly-locust based neuronal control system applied to an unmanned aerial vehicle: the invertebrate neuronal principles for course stabilization, altitude control and collision avoidance. The International Journal of Robotics Research, 26(7), pp. 759-772.
Meng, H., Appiah, K., Yue, S., Hunter, A., Hobden, M., Priestley, N., Hobden, P. & Petit, C. (2010). A modified model for the Lobula Giant Movement Detector and its FPGA implementation. Computer vision and image understanding. 114(11), pp. 1238-1247.
Yue, S., & Rind, F. C. (2012). Visually stimulated motor control for a robot with a pair of LGMD visual neural networks. International Journal of Advanced Mechatronic Systems, 4(5), pp. 237-247.
O'Shea, M., & Williams, J. L. D. (1974). The anatomy and output connection of a locust visual interneurone; the lobular giant movement detector (LGMD) neurone. Journal of comparative physiology, 91(3), pp. 257-266.
Judge, S., & Rind, F. (1997). The locust DCMD, a movement-detecting neurone tightly tuned to collision trajectories. The Journal of experimental biology.200 (16), pp. 2209-2216.
Balduzzi, David, and Giulio Tononi. "What can neurons do for their brain? Communicate selectivity with bursts." Theory in Biosciences 132.1 (2013), pp. 27-39.
Nere, Andrew, et al. "A neuromorphic architecture for object recognition and motion anticipation using burst-STDP." PloS one 7.5 (2012), pp. e36958.
Dan Y, Poo MM (2004) Spike timing-dependent plasticity of neural circuits. Neuron 44, pp. 23-30.
Brette, et. Al, "Simulation of networks of spiking neurons: A review of tools and strategies," J Comput Neurosci, (2007), pp. 1-50, DOI 10.1007/s10827-007-0038-6.
Laurent Itti, Christof Koch, "A saliency-based search mechanism for overt and covert shifts of visual attention," Vision Research, 40 (10), pp. 1489-1506, (2000).
Office Action 1 for U.S. Appl. No. 14/680,057, dated Mar. 1, 2017.
Evolving spiking neural networks: A survey, Stefan Schliebs et al., Evolving systems, DOI: 10.1 007/s12530-013-9074-9, Jun. 2013, pp. 1-12.
Image processing with spiking Neuron Networks, Meftah et al., Springer, SCI427, 2012, pp. 525-544.
Artificial Neural image processing applications: A survey, Quintana et al., Advance online publication, 2012, pp. 1-13.
Response to Office Action 1 for U.S. Appl. No. 14/680,057, dated Jun. 30, 2017.

* cited by examiner

SYSTEM AND METHOD FOR REAL-TIME COLLISION DETECTION

CROSS-REFERENCE TO RELATED APPLICATIONS

This is a Continuation-in-Part application of U.S. Non-Provisional application Ser. No. 14/680,057, filed in the United States on Apr. 6, 2015, entitled, "Spiking Neural Network Simulator for Image and Video Processing."

GOVERNMENT LICENSE RIGHTS

This invention was made with government support under U.S. Government Contract Number HR0011-09-C-0001. The government has certain rights in the invention.

BACKGROUND OF INVENTION

(1) Field of Invention

The present invention relates to a system and method for collision detection and, more particularly, to a system and method for real-time collision detection using visual sub-fields.

(2) Description of Related Art

A collision detection and avoidance ability is essential for almost all moving objects either nature-created (animals) or man-made (e.g., unmanned aerial vehicles (UAVs), cars, ships). While visual sensors are becoming increasingly inexpensive and reliable, visually guided collision avoidance methods have been actively sought out. In particular, when working on small robots (such as micro UAVs or nano UAVs), weight, cost and power consumption becomes an essential factor. As a result, a collision avoidance approach with a single, light-weighted front camera is highly desired.

Inspired by the locust's motion vision, Badia et al. (see the List of Incorporated Literature References, Literature Reference No. 1) suggested a collision detection model (non-spiking) for a UAV that is equipped with two charge coupled device (CCD) color cameras mounted on the front part of the UAV separated by 110 degrees pointing to the left and right side, respectively. For images from each camera, the model first uses a traditional Reichardt motion detector to detect motions in four directions and then sums them all to give collision information. Their model cannot distinguish whether an object is approaching the UAV, receding away from the UAV, or just translating in front of the UAV. It raises a collision flag in each of the three situations. Therefore, the model is unlikely to work well in real environments.

Thus, a continuing need exists for a collision detection model that is based on low-power spiking neural networks and can distinguish whether an object is approaching, receding, or translating for use in real world environments.

SUMMARY OF THE INVENTION

The present invention relates to a system for collision detection and, more particularly, to a system for collision detection based on a low-power spiking neural network implementation of the Reichardt motion detector. The system comprises one or more processors and a non-transitory computer-readable medium having executable instructions encoded thereon such that when executed, the one or more processors perform multiple operations. The system divides an image in a sequence of images into a plurality of visual sub-fields comprising two sets of complementary visual sub-fields, the sequence of images having been captured by a moving visual sensor. For each visual sub-field in the plurality of visual sub-fields, motion is detected in a direction corresponding to the visual sub-field using a first detector. For each visual sub-field in the plurality of visual sub-fields, motion is detected in a direction complementary to the visual sub-field using the first detector. Using a movement detector, an output of the first detector is processed, the output comprising data corresponding to one direction of movement from two complementary visual sub-fields. Based on an output of the movement detector, an impending collision is signaled.

In another aspect, the two sets of complementary visual sub-fields comprise a left visual sub-field, a right visual sub-field, an up visual sub-field, and a down visual sub-field, and wherein the left visual sub-field and the right visual sub-field are a set of complementary visual sub-fields, and the up visual sub-field and the down visual sub-field are a set of complementary sub-fields.

In another aspect, data corresponding to one of the complementary visual sub-fields is used to inhibit data corresponding to the other one of the complementary visual sub-fields.

In another aspect, the inhibition is performed by subtracting the data corresponding to one of the complementary visual sub-fields from the data corresponding to the other one of the complementary visual sub-fields.

In another aspect, spikes from a plurality of Lobula Giant Movement Detector (LGMD) cell models are accumulated into corresponding spikes accumulators, each LGMD cell model corresponding to a visual sub-field. The spikes of the spikes accumulators are combined, and an impending collision is signaled when the combination of the spikes of the spikes accumulators exceeds a predetermined threshold.

In another aspect, a descending contralateral motion detector (DCMD) is used to sum the spikes of the spikes accumulators to signal the impending collision.

In another aspect, the system distinguishes whether an object in the image is approaching, receding, or translating.

In another aspect, the first detector is a Reichardt detector.

In another aspect, the Reichardt detector is a spiking detector.

In another aspect, the system further comprises an autonomous robot having a visual sensor for capturing the sequence of images in a direction of movement.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
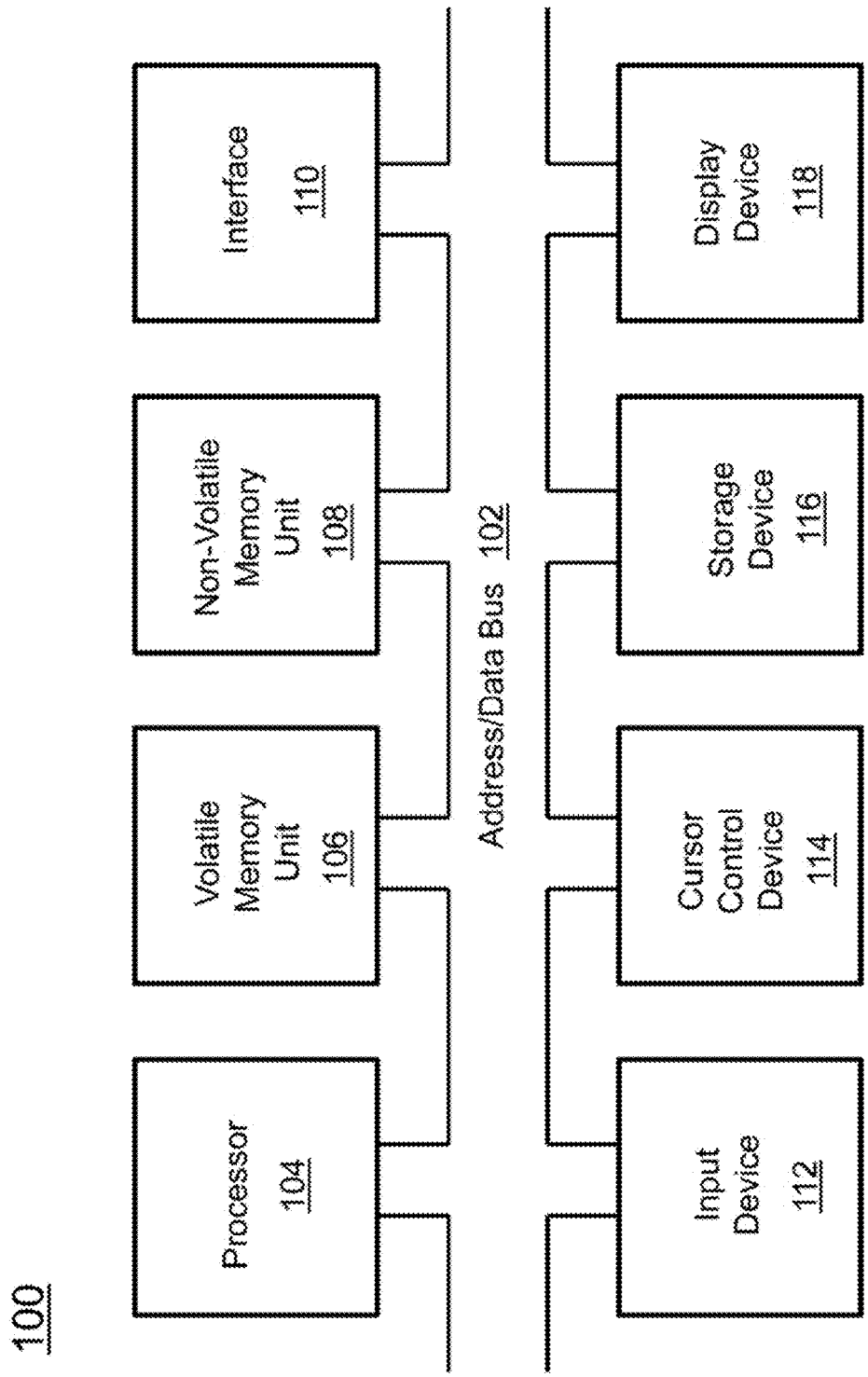
FIG. 1 is a block diagram depicting the components of a system for collision detection according to some embodiments of the present invention.

The present invention relates to a system for collision detection and, more particularly, to a system for collision detection based on a low-power spiking neural network implementation of the Reichardt motion detector. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully included herein. The references are cited in the application by referring to the corresponding literature reference number, as follows:

1. Badia, S. B. I., Pyk, P., & Verschure, P. F. (2007). A fly-locust based neuronal control system applied to an unmanned aerial vehicle: the invertebrate neuronal principles for course stabilization, altitude control and collision avoidance. The international Journal of Robotics Research, 26(7), 759-772.
2. Meng, H., Appiah, K., Yue, S., Hunter, A., Hobden, M., Priestley, N., Hobden, P. & Pettit, C. (2010). A modified model for the Lobula Giant Movement Detector and its FPGA implementation. Computer vision and image understanding, 114(11), 1238-1247.
3. Yue, S., & Rind, F. C. (2012). Visually stimulated motor control for a robot with a pair of LGMD visual neural networks. International Journal of Advanced Mechatronic Systems, 4(5), 237-247.

4. Hassenstein, B., and Reichardt, W. (1956). Systemtheoretische Analyse der Zeit-, Reihenfolgen-und Vorzeichenauswertung bei der Bewegungsperzeption des Riisselkiifers Chlorophanus. Z Naturforsch IIb, 513-524.
5. Reichardt, W. (1961). Autocorrelation, a principle for the evaluation of sensory information by the central nervous system. In Sensory Communication, W. A. Rosenblith, ed. (New York, London: MIT Press and Wiley), pp. 303-317.
6. Haag, J., Denk, W., & Borst, A. (2004). Fly motion vision is based on Reichardt detectors regardless of the signal-to-noise ratio. Proceedings of the National Academy of Sciences of the United States of America, 101(46), 16333-16338.
7. Reid R. Harrison and Christof Koch (1998) An Analog VLSI Model of the Fly Elementary Motion Detector. In Advances in Neural Information Processing Systems 10, M. I. Jordan, M. J. Kearns, S. A. Solla, eds. MIT Press, Cambridge, Mass., pp. 880-886.
8. Cruz-Albrecht, J. M., Yung, M. W., & Srinivasa, N. (2012). Energy-efficient neuron, synapse and STDP integrated circuits. IEEE transactions on biomedical circuits and systems, 6(3), 246-256.
9. Scrofano, R., Choi, S., & Prasanna, V. K. (2002). Energy efficiency of FPGAs and programmable processors for matrix multiplication. In Field-Programmable Technology, 2002. (FPT). Proceedings. 2002 IEEE International Conference on (pp. 422-425).
10. O'Shea, M., & Williams, J. L. D. (1974). The anatomy and output connection of a locust visual interneurone; the lobular giant movement detector (LGMD) neurone. Journal of comparative physiology, 91(3), 257-266.
11. Judge, S., & Rind, F. (1997). The locust DCMD, a movement-detecting neurone tightly tuned to collision trajectories. The Journal of experimental biology, 200 (16), 2209-2216.

Various embodiments have three "principal" aspects. The first is a system for collision detection. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
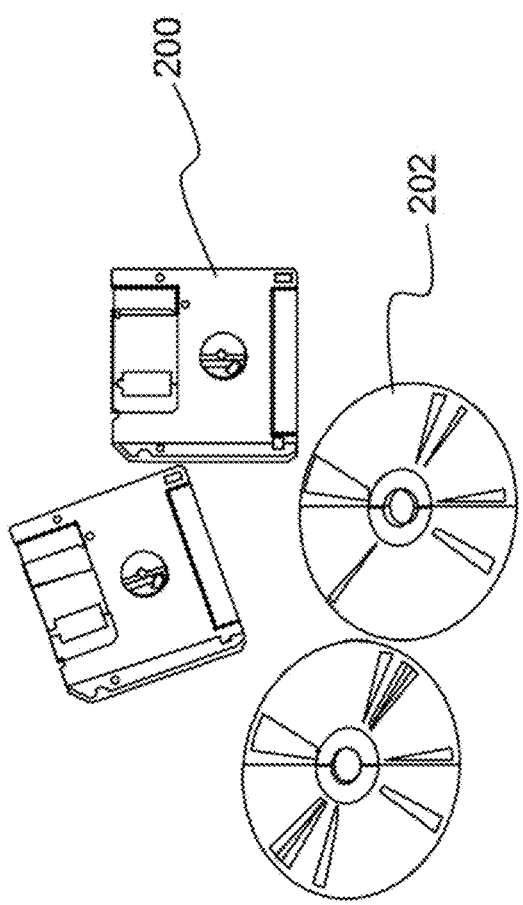
FIG. 2 is an illustration of a computer program product according to some embodiments of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

A collision detection and avoidance ability is essential for almost all moving objects, whether nature-created (animals) or man-made (e.g., unmanned aerial vehicles (UAVs), cars, ships). While visual sensors are becoming increasingly inexpensive and reliable, visually guided collision avoidance methods have been actively sought. In particular, when working on small robots (such as micro UAVs or nano UAVs), weight, cost and power consumption becomes an essential factor. As a result, a collision avoidance approach with a single light-weight front camera is highly desired.

Inspired by insects' navigation systems (such as flies and locusts), some models have been suggested (for examples, see Literature Reference Nos. 1, 2, and 3). However, these models do not work well on complex environments (e.g. indoor missions). Thus, described herein is a novel spiking neural network model (SNN) of collision detection based on Reichardt motion detector (see Literature Reference No. 5) for low-power neuromorphic hardware implementations.

(4) SPECIFIC DETAILS OF THE INVENTION

Figure 10:
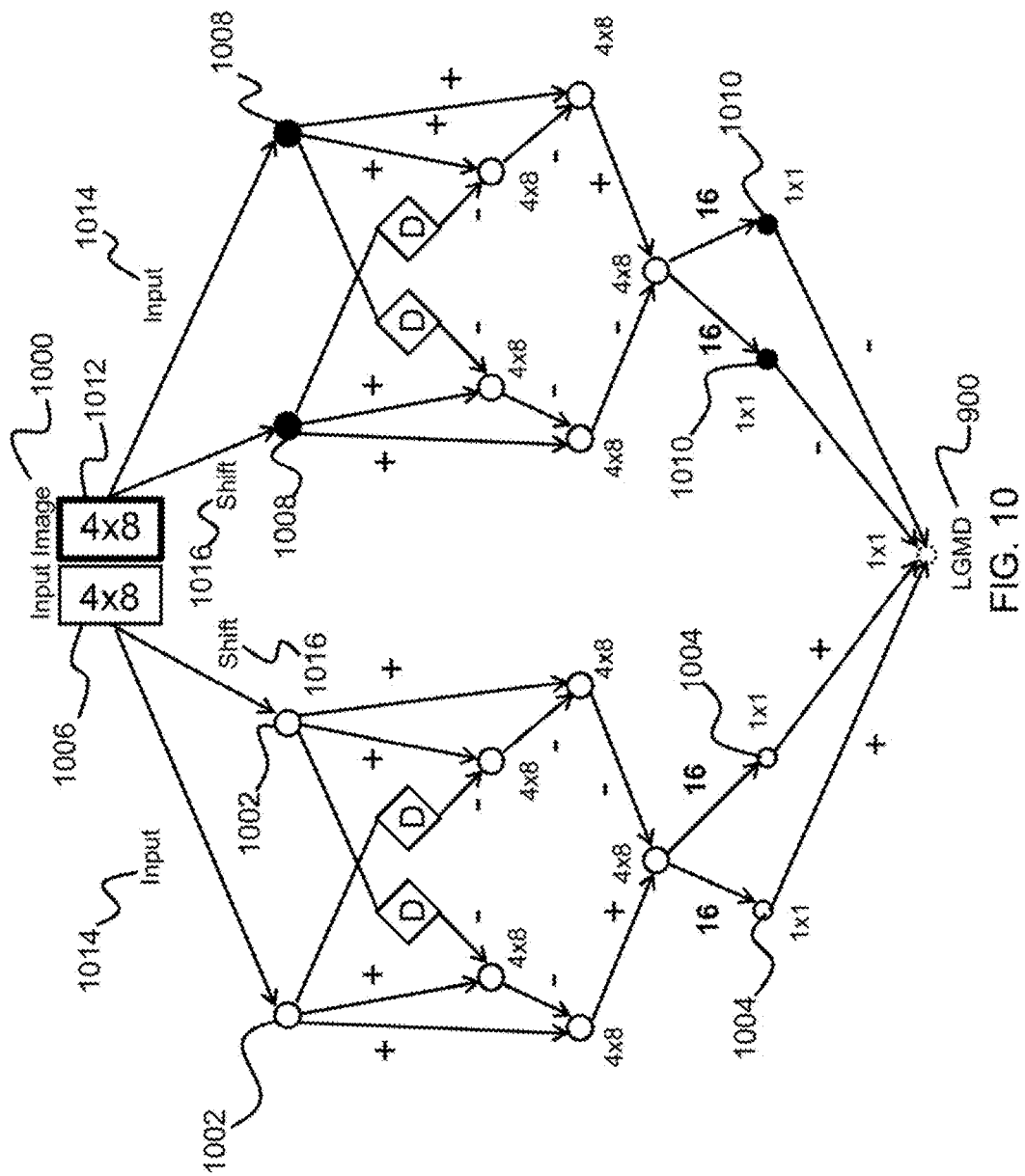
FIG. 10 is an illustration of the Lobula Giant Movement Detector (LGMD) cell model (left visual field) according to some embodiments of the present invention.
Figure 11:
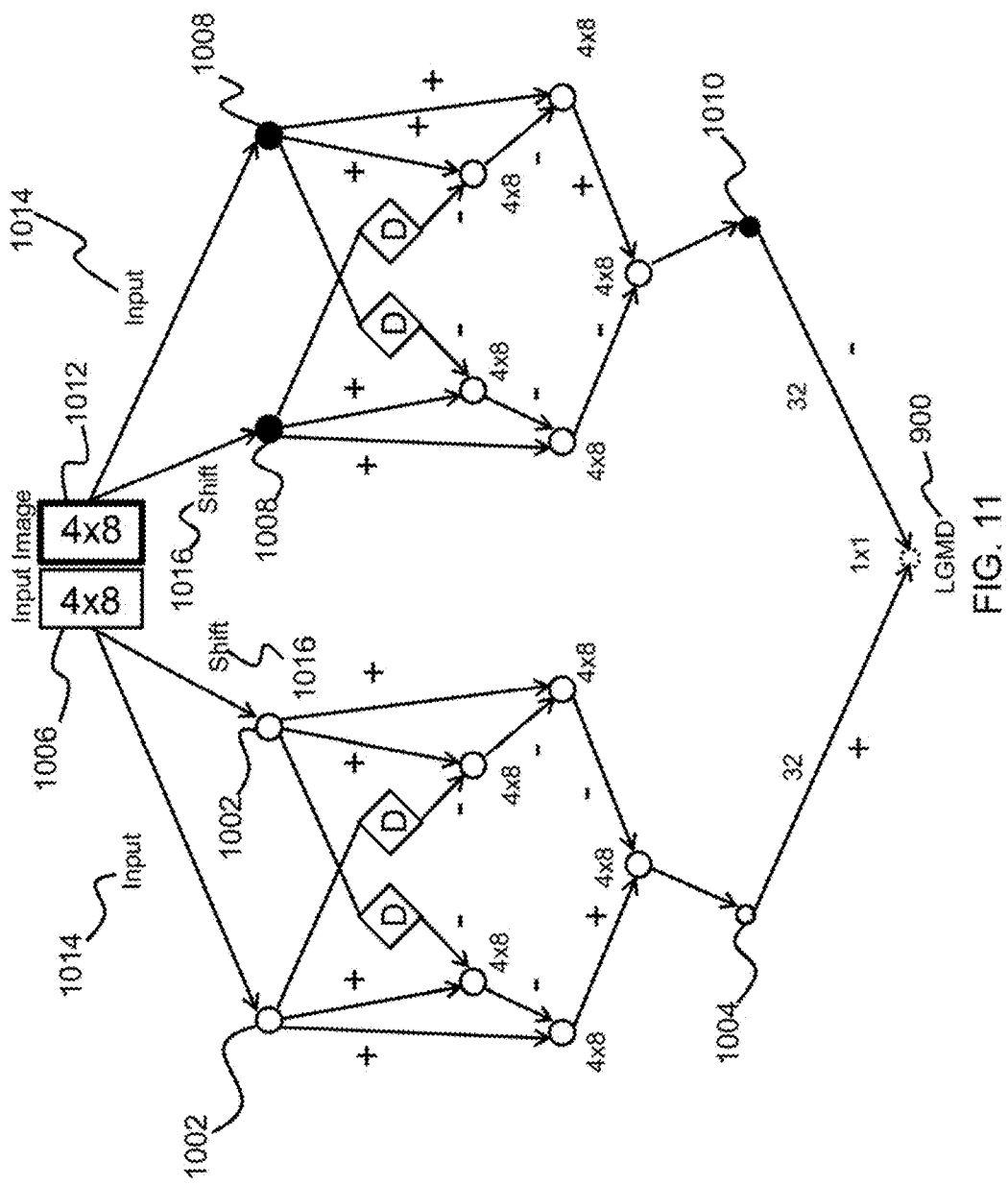
FIG. 11 is an illustration of the LGMD model (left visual field) without hardware constraint according to some embodiments of the present invention.

Described is a novel spiking neural network (SNN) approach and implementation for real-time collision and obstacle detection using a single camera (i.e., monocular video). Various embodiments of the SNN implementation map directly to emerging spiking neuromorphic hardware at ultra-low power, enabling a new class of efficient, small autonomous robots. Additionally, various embodiments of the present invention work with very low resolution images and functions in real and cluttered environments. For example, a normal 640×230 pixels image can be down sampled to 32×24 pixels, or even further to 8×8 pixels. FIGS. 10 and 11 use an 8×8 pixels image for illustration.

(4.1) Reichardt Detector and its Implementation with Spiking Neural Networks (SNN)

The Reichardt Motion Detector (RMD) (also referred to as the Hassenstein-Reichardt detector or correlation-type motion detector), based on the fly visual system (described In Literature Reference Nos. 4, 5, and 6), operates by multiplying an image with its time-shifted (delayed) image. This operation of correlation is computationally expensive. Hardware implementations are, therefore, power hungry.

Figure 3:
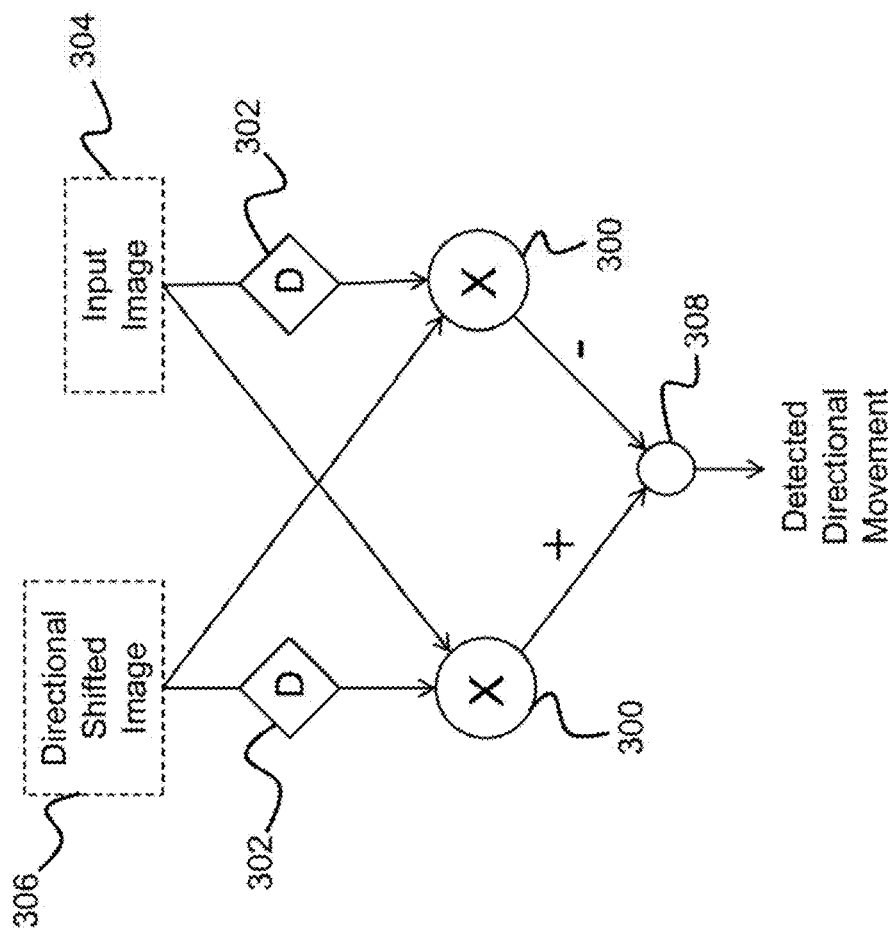
FIG. 3 is an illustration of a conventional Reichardt motion detector (RMD)

FIG. 3 depicts a conventional RMD. The conventional RMD computes the direction of image motion by multiplying (represented by ×300) the intensity values at two adjacent image points in which one of them has a time delay (represented by D 302). Mathematically, this is equivalent to shifting the original input image 304 a predetermined number of pixels in the motion direction to be detected, resulting in a directional shifted image 306, and then multiplying the input image 304 and the directional shifted image 306 together with a specified delay (D 302) included. This procedure is performed in two mirror-symmetrical subunits, and then their outputs are subtracted from one another to determine the detected directional movement 308. Correlation computation requires multiplication of two image arrays and is computationally expensive.

Reid et al. (see Literature Reference No. 7) developed an analog very-large-scale-integration (VLSI) version of the RMD, but their model is a continuous-time analog circuit with integrated photoreceptors and is not spiking in nature. The fly visual system (described in Literature Reference No. 6) operates using spikes (just as the human brain does) and a spiking implementation is desired. Various embodiments of the present invention prove that the RMD using spikes is not only accurate, but can also be ultra-low power in hardware.

(4.1.1) Spiking Reichardt Motion Detector

Figure 4:
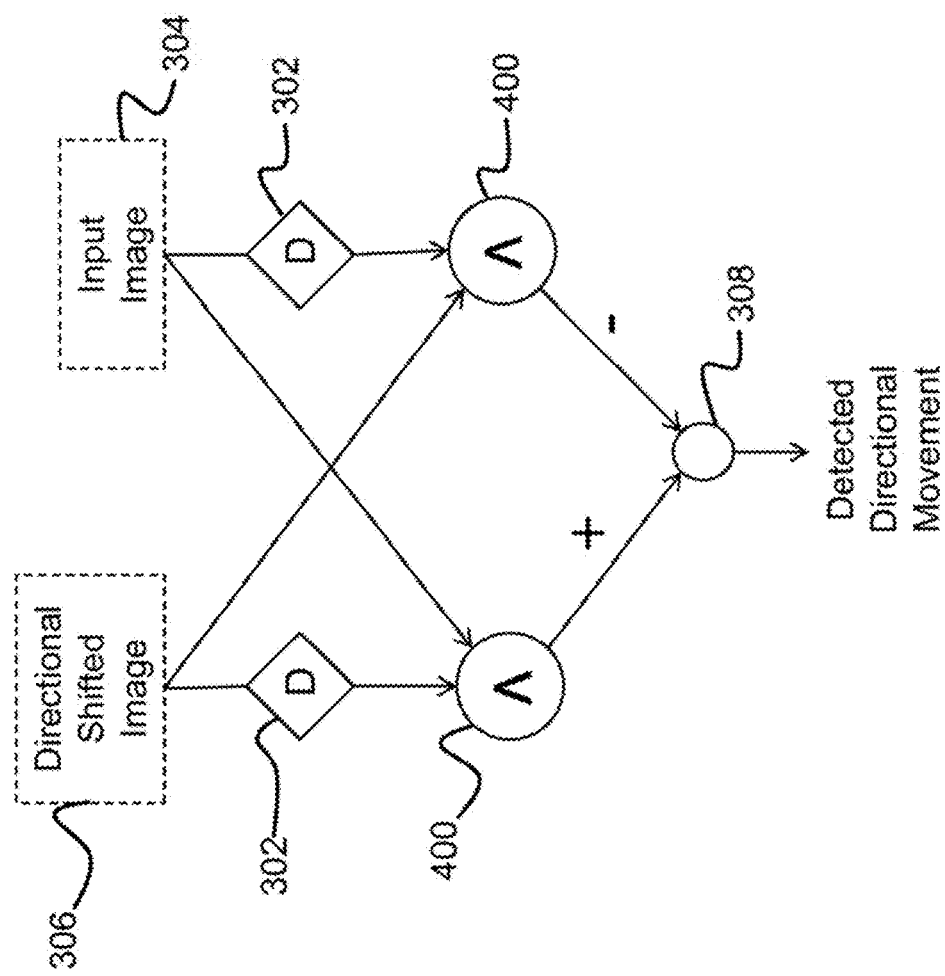
FIG. 4 is an illustration of a modified RMD according to some embodiments of the present invention.

To implement the RMD with spiking neural networks (SNN), various embodiments implement multiplication in the Reichardt circuit (illustrated in FIG. 3) with SNN. An approximation of the multiplication operator is implemented by a minimum operator. FIG. 4 illustrates a modified Reichardt detector according to an embodiment of the present invention by replacing the multiplication operation (×300) with a minimum operation (represented by $\wedge$400).

In particular, the minimum operation $\wedge$400 can be represented according to the following:

$$a \wedge b = [a - [a-b]^+]^+, \text{ where } [\bullet]^+ = \max(\bullet, 0), \text{ and } a, b > 0. \quad (1)$$

The rectification operation $[\bullet]^+$ is implemented using integrate-and-fire spiking neurons, whose membrane potentials (V) are defined according to the following:

$$V(t) = L + V(t-1) + I(t), \quad (2)$$

If $V(t) \geq \theta$, spike and reset $V(t)=0$, (3)

If $V(t) < -\vartheta$, reset $V(t) = -\vartheta$. (4)

Figure 5:
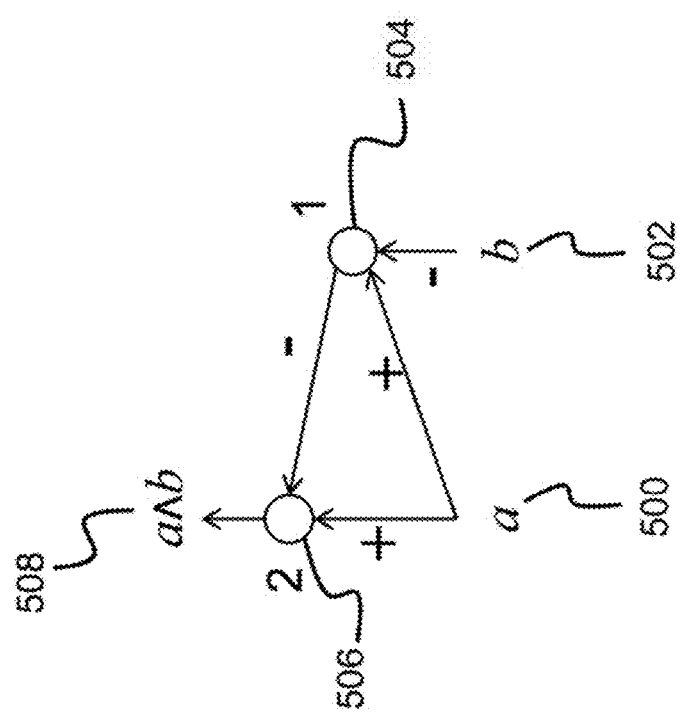
FIG. 5 is an illustration of a spiking neural network (SNN) for minimum operation according to some embodiments of the present invention.

Here, L is a leakage constant, and I(t) is the weighted sum of all inputs. For example, $I(t)=a(t)-b(t)$ for $[a-b]^+$, where a(t) and b(t) are spiking signals generated from numbers a and b. Whenever its membrane potential V exceeds a threshold θ, the neuron fires and V is reset to zero (equation (3)). The membrane potential V is allowed to go below the resting state zero, but a lower bound ($\vartheta$) is added to prevent it from going too far below zero (equation (4)). Simulations show that allowing V to be negative helps compute the minimum with good accuracy. FIG. 5 illustrates a spiking neural network (SNN) for the minimum operation of numbers a 500 and b 502. Referring to equation (1), neuron 1's 504 output is $[a-b]^+$ and neuron 2's 506 output is $a \wedge b$ 508.

Figure 6:
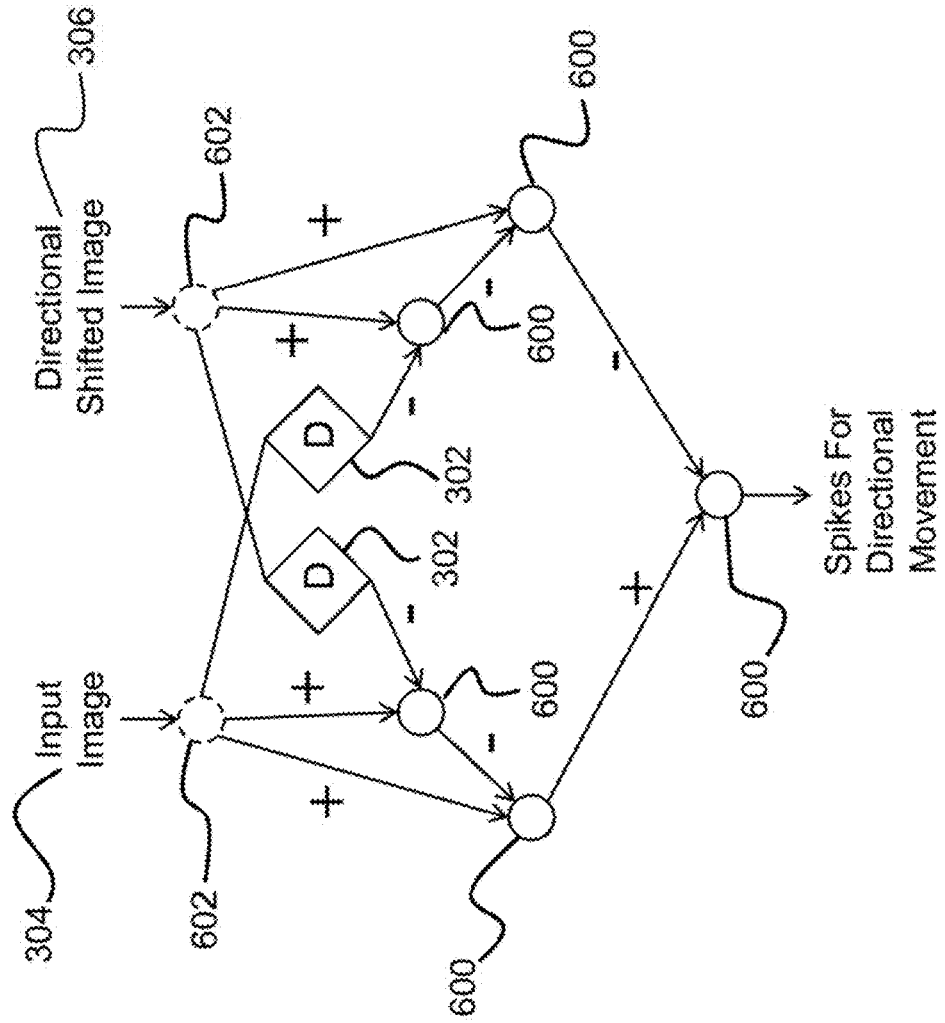
FIG. 6 is an illustration of a spiking RMD circuit according to some embodiments of the present invention.

A spiking Reichardt Motion Detector (RMD) circuit is depicted in FIG. 6. Each node 600 denotes a neuron, while its input is an image pixel. Dashed nodes 602 denote spike generators. When the input is an image map, each node can denote the whole image map in which there is no lateral connection among neurons. The directional shifted image 306 is obtained by shifting the input image 304 s pixels in the motion direction to be detected, where the shift size s depends on the motion speed to be detected. The faster the motion speed, the larger the shift size is. In experimental studies, a default value of one was used. D 302 denotes signal delay. The default value for delay is one video frame. In the spiking simulation, depending on how many time-steps are being used to compute each frame, the D 302 can have a value greater than one.

(4.1.2) Implementing Multiplication Operator with Minimum Operator

Table 1 shows a reduction to practice and simulation result for the method. A and B are two random matrices, min( ) is the minimum operator results, and snn_min( ) is the normalized result from the SNN. Referring to FIG. 5 and equations (1-4): L=0, θ=0.99 for neuron 1 504, θ=2 for neuron 2 506, and $\vartheta$ =4θ.

The spike a(t) is generated from number a 500 as follows. At time t, a spike is generated (a(t)=1) if $$\text{rand}( ) < \gamma a, \quad (5)$$

where rand( ) is a random number generator with uniform distribution on (0,1), and (0.5) is a constant to scale the frequency of spikes generated. The simulation was run T=1000 time steps. Let N(a,b) equal the total number of spikes from neuron 2 506, then the normalized result (see Table 1 below) is defined as:

$$snn_{min(a,b)} = \frac{\theta_2}{T_\gamma} N(a,b).,$$

where $\theta_2$ is the firing threshold for neuron 2 506. As can be seen from the last row of Table 1, the SNN implements the minimum operator that approximates the real minimum operator well, which can be measured by the difference between the SNN minimum from the real minimum. In particular, it is capable of computing the correlation in the Reichardt detector.

Table 1: Simulation Result of a Minimum Operator Using SNN.

A and B are two matrices of random numbers used as input to the minimum operator. Row snn_min(A,B) is the minimum computed by SNN for each corresponding elements in A and B. Row min(A,B) is the real minimum of corresponding elements in A and B. The last row is the difference of corresponding elements in snn_min(A,B) and min(A,B), which gives an indication how well the SNN minimum operator works. The smaller the absolute value of "snn_min(A,B)–min(A,B)" is, the better.

| | | | | |
|---|---|---|---|---|
| A | 0.9505 | 0.4384 | 0.0908 | 0.0560 |
| | 0.2556 | 0.2465 | 0.3314 | 0.3058 |
| | 0.9534 | 0.8675 | 0.7763 | 0.8215 |
| | 0.5075 | 0.3893 | 0.8278 | 0.5203 |
| B | 0.7359 | 0.2784 | 0.4269 | 0.5715 |
| | 0.4145 | 0.2814 | 0.0535 | 0.7705 |
| | 0.2334 | 0.4184 | 0.9376 | 0.2909 |
| | 0.1451 | 0.0317 | 0.9436 | 0.0933 |
| snn_min(A,B) | 0.7320 | 0.2360 | 0.1080 | 0.0520 |
| | 0.2520 | 0.2120 | 0.0560 | 0.3360 |
| | 0.1960 | 0.4480 | 0.7160 | 0.2800 |
| | 0.1520 | 0.0440 | 0.8080 | 0.1120 |
| min(A,B) | 0.7359 | 0.2784 | 0.0908 | 0.0560 |
| | 0.2556 | 0.2465 | 0.0535 | 0.3058 |
| | 0.2334 | 0.4184 | 0.7763 | 0.2909 |
| | 0.1451 | 0.0317 | 0.8278 | 0.0933 |
| snn_min(A,B) – min(A,B) | -0.0039 | -0.0424 | 0.0172 | -0.0040 |
| | -0.0036 | -0.0345 | 0.0025 | 0.0302 |
| | -0.0374 | 0.0296 | -0.0603 | -0.0109 |
| | 0.0069 | 0.0123 | -0.0198 | 0.0187 |

(4.1.3) Spiking Reichardt Motion Detector (RMD)

The spiking model was developed and implemented in MATLAB with SpikeSim software, as described in further detail in U.S. application Ser. No. 14/680,057. To test the spiking RMD, neurons (nodes 600) are used as spike generators, as depicted in FIG. 6. The neuron (node 600) obeys the same spiking dynamics defined by equation (2), but its input is image intensity with a value in the range [0-1]. In particular, in the simulation, the spike generator neuron (node 600) has a leakage constant L=0 and firing threshold θ=0.5. Each frame was computed for 10 time-steps in the simulation. Table 2 below shows all parameters of spike neurons in the spiking RMD used in the simulation.

Figure 7:
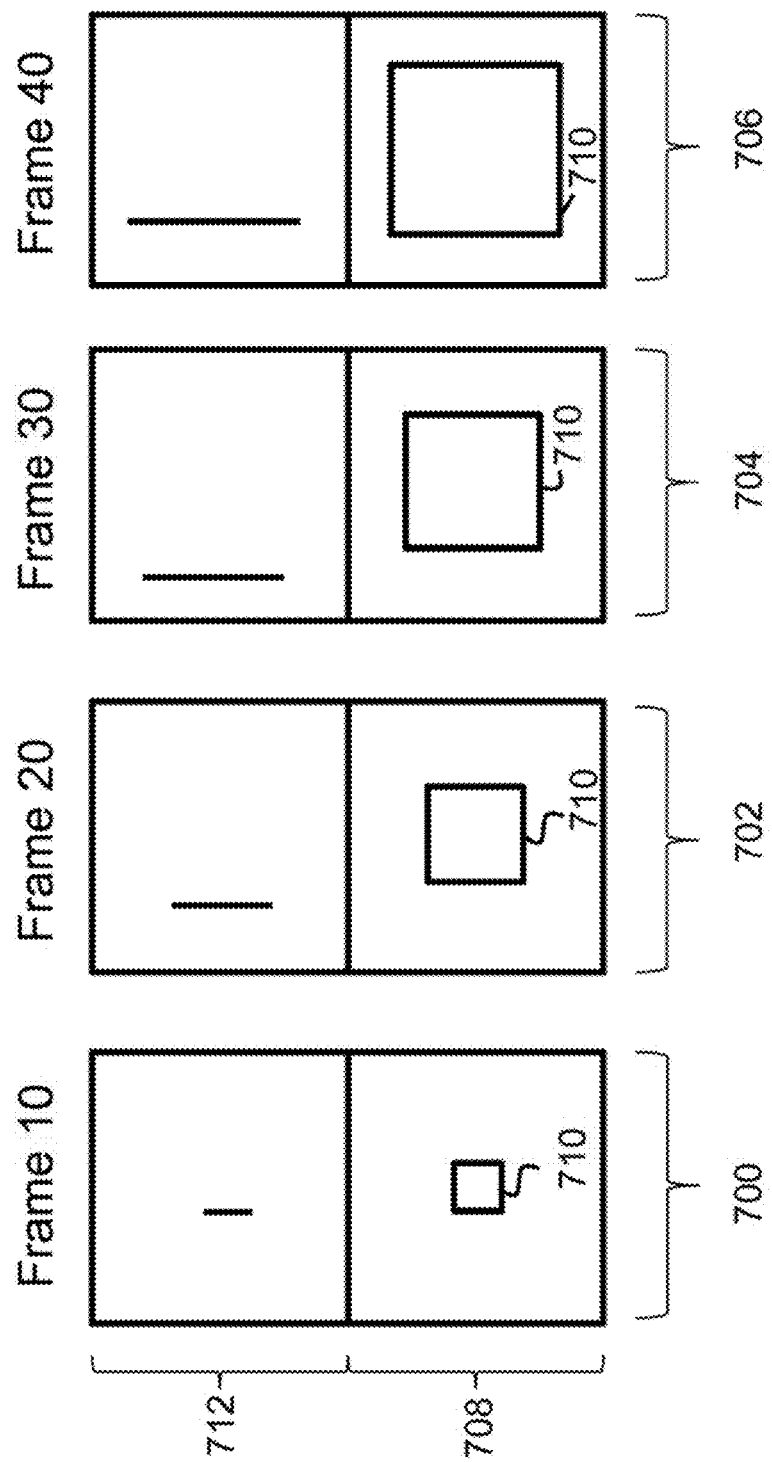
FIG. 7 is an illustration of spiking RMD output for left direction motion detection according to some embodiments of the present invention.

FIG. 7 illustrates the spiking RMD output for left direction motion detection (frame number 10, element 700; frame number 20, element 702; frame number 30, element 704; and flame number 40, element 706). The bottom row 708 represents the input image of an expanding square 710. The top row 712 represents the spiking RMD output spike count for each pixel displayed as an image. Note that the RMD spikes correspond to the exact location of the input image motion in left direction (as the square expands only its left edge is moving in the left direction). Similar results were seen for other directions. This non-limiting example used a spiking neuron as the spike generator (represented by the dashed node 602 in FIG. 6). The spiking RMD was also tested on real-world video scenes with accurate results.

TABLE 2

Parameter for Spiking Reichardt Detector Simulation

| | Leakage (L) | Firing Threshold (θ) | Lower Threshold (θ) |
|---|---|---|---|
| Spike Generator | 0 | 0.5 | 0 |
| 2$^{nd}$ Layer | 0 | 0.99 | 4θ |
| 3$^{rd}$ Layer | 0 | 2 | 4θ |
| Output Layer | 0 | 2 | 4θ |

(4.1.4) Comparison of Power Consumption of Conventional RMD and Spiking RMD

Below is a comparison of power consumption estimates for a conventional RMD and the spiking RMD.

(4.1.4.1) Power Consumption Estimate for Conventional RMD Implemented on a Xilinx Virtex-II Field Programmable Gate Array (FPGA).

The Xilinx Virtex-II FPGA is described in Literature Reference No. 9. Xilinx, Inc. is located at 2100 Logic Drive, San Jose, Calif. 95124.

For 8×8 matrix multiplication, latency L=38.8 cycles or 0.078 μsec (microseconds) at 500 MHz clock cycle and p=15 (from equation (1) below)

$$L = \left(\frac{n}{p}\right)^3 (p^2 + 2p + 1) \quad (1)$$

and
Energy=41.8 nJ (from equation (2) and Table 2 below)

$$E = L\left(pP_M + p\left[\frac{p}{16}\right]P_S + 4pP_R + 2P_{IO} + P_{Ie}\right). \quad (2)$$

TABLE 2

Values for Power Parameters in the Energy Consumption Equation

| Variable | Power (mW) |
|---|---|
| $P_M$ | 17 |
| $P_S$ | 8.39 |
| $P_R$ | 2.34 |
| $P_{IO}$ | 11.31 |
| $P_{Ie}$ | 10.00 |

Since the conventional RMD requires two such multiplications for each frame (ignoring energy for subtraction), then total energy (per frame): 83.6 nJ (41.8 nJ×2=83.6 nJ).

For a frame rate of 30 frames/second, this gives power consumption of 2508 nW (30×83.6). In contrast, the SNN consumes 6.3 nW power, as will be described below. Therefore, a conventional FPGA consumes 398× more power than the SNN approach described herein.

(4.1.4.2) Power Estimate of Spiking RMD

The following is an estimation of power consumption of the spiking RMD using HRL SyNAPSE hardware power estimates from Literature Reference No. 8:

Neuron: 0.5 pJ (picojoules)/spike
Synapse: 0.37 pJ/spike with STDP (spike-timing dependent plasticity)
learning and 0.37×0.2=0.074 pJ/spike without STDP learning The number of post-synaptic (neuron) and synaptic (synapses) spikes were measured during the execution of the spiking RMD (in the left direction). For an image of size 8×8 pixels, the following were measured per frame:

Neurons: 186 spikes without input spikes
Synapses: 1602 spikes transmitted

Based on the above, the following was estimated:
Neuron energy consumption: 93 pJ
Synapse energy consumption: 118 pJ
Total Energy: 211 pJ (per frame)

Assuming a frame rate of 30 frames per second, total energy per second (i.e., power) is:

211 pJ/frame×30 frames/sec=6330 pJ/sec=6.3 nW (nano watts).

Therefore, it was estimated that the spiking RMD only consumes 6.3 nW power for an 8×8 pixel input image. In contrast, energy consumption for a Xilinx Virtex-II field programmable gate array (FPGA) implementation is 2508 nW power, as described above.

(4.2) Spiking Model of Collision Detection

Figure 8:
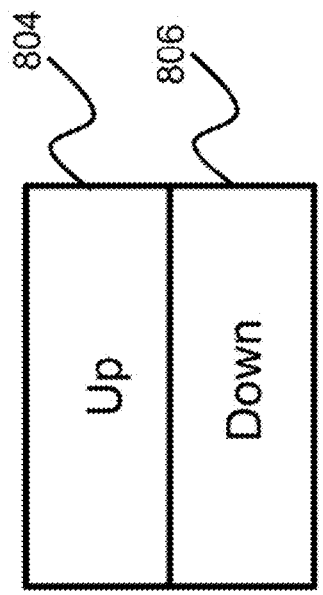
FIG. 8 is an illustration of dividing an input image into visual sub-fields according to some embodiments of the present invention.
Figure 8:
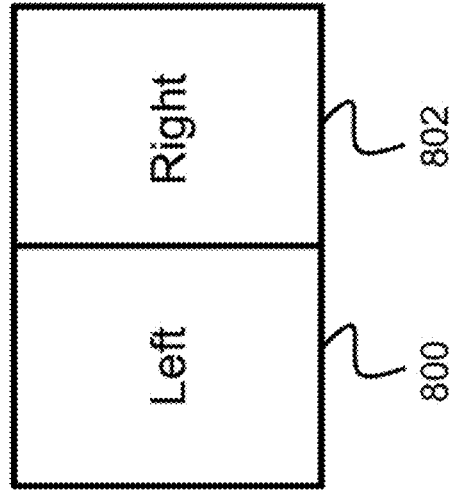

As depicted in FIG. 8, an input image was divided into four visual fields: left 800, right 802, up 804, and down 806. Here, left 800 and right 802 as well as up 804 and down 806 are referred to as complementary visual fields. Then, for each visual sub-field, the motion in the corresponding direction (e.g. left direction for left 800 visual field) is computed using the spiking Reichardt detector described above. Intuitively, when an object is approaching, the features in the left 800 visual field will move left, and features in the right 802 visual field will move right. Inversely, when an object is receding, the features in the left 800 visual field will move right, and features in the right 802 visual field will move left. The same is also true for the up 804 and down 806 visual fields.

Figure 9:
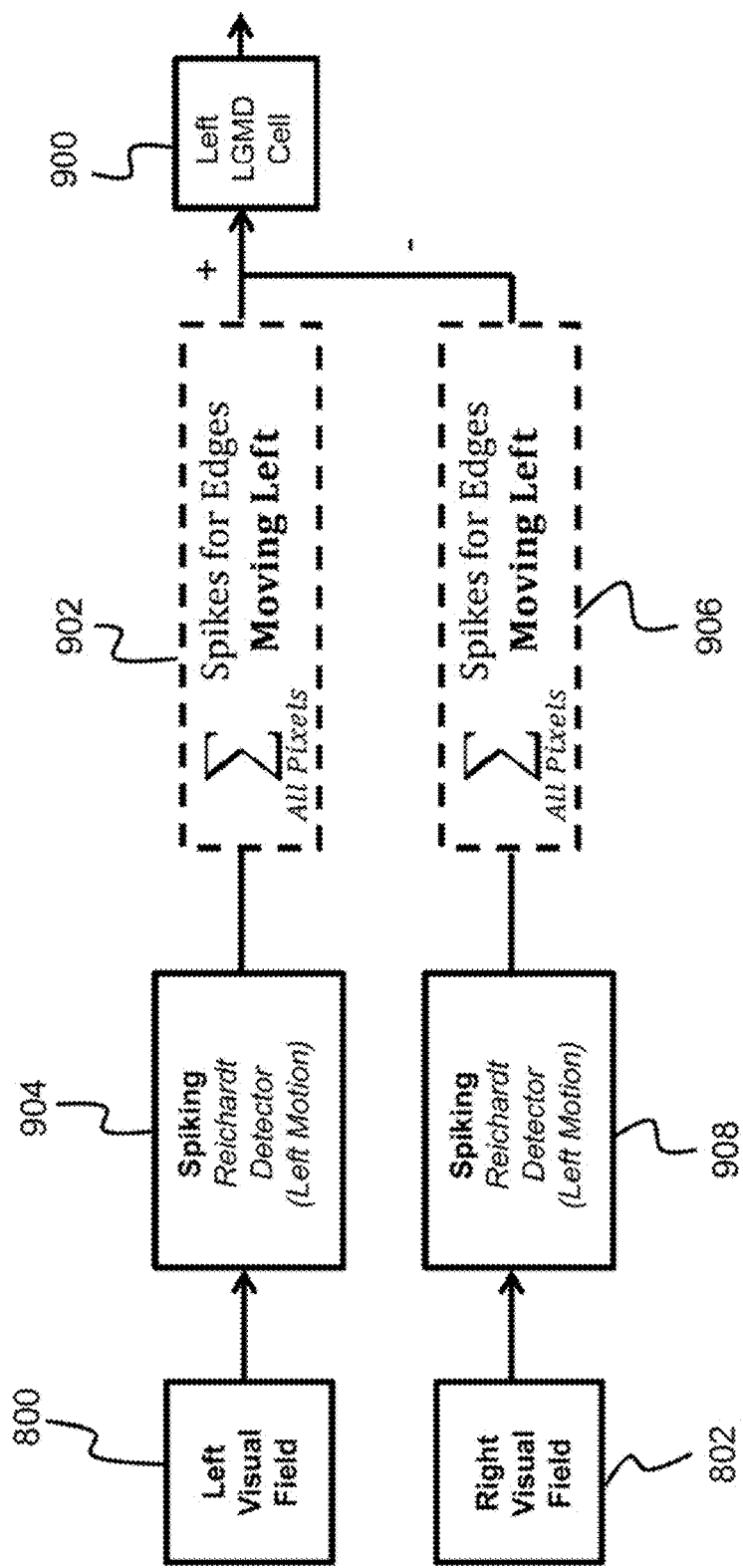
FIG. 9 is an illustration of a first part of a spiking collision detection model according to some embodiments of the present invention.

According to this observation, one can determine whether an object is approaching or receding. For example, consider the left 800 visual field. FIG. 9 shows a block diagram of the first part of the collision detection model according to an embodiment, in which the response of the left Lobula Giant Movement Detector (LGMD) cell 900 is computed using spiking Reichardt detectors. The model LGMD cell (which is described in Literature Reference No. 10) is inspired by the locust's motion detection system, which is known to have a highly specialized neuron that responds to approaching predators: the Lobula Giant Movement Detector (LGMD).

As shown in FIG. 9, the excitatory (positive) input to the model left LGMD cell 900 is all of the spikes for edges moving left 902 at a current time that are the output of the spiking Reichardt detector for detecting left motion 904 on the left visual field 800. The inhibitory (negative) input is all the spikes for edges moving left 906 that are the output of the spiking Reichardt detector for detecting left motion 908 on the right visual field 802. The inhibitory input (element 906) is an important part of the LGMD cell model. When a moving robot is approaching an obstacle, ideally the obstacle edges in the left 800 visual field should move left, and objects in the right 802 visual field should move right. However, because the moving camera is shaking, there are a lot of small translation movements to the left or right in both complementary visual fields. If no action is taken, the translation movements will add motion signals to the LGMD cell as noise, which makes the LGMD cell generates false alarm. Since the translation movements move at the same direction in both complementary visual fields at a given moment, by subtracting the left moving signals in the right 802 visual field from the left 800 visual field, one can eliminate most translational noise.

FIG. 10 illustrates a detailed diagram of the LGMD cell model (left visual field), using an input image 1000 size 8×8 as an example. The unfilled circles 1002 and 1004 and unbolded rectangle 1006 denote the left visual field. The filled circles 1008 and 1010 and bolded rectangle 1012 denote the right visual field. "Input" 1014 denotes the original left or right half of the input image 1000, while "shift" 1016 denotes its directional shifted copy (denoted as element 306 in FIG. 3). Nodes represented by elements 1002 and 1008 are spike generators, which are not needed if the inputs are spikes. The unbolded numbers (e.g., 4×8) denote the number of neurons (neuron map size) at each node working in parallel. The bold numbers (i.e., 16) denote the number of synapses that fan into the postsynaptic neuron. In FIG. 10, it is assumed a hardware constraint (e.g., HRL Synapse chip) that the maximum number of fan-ins (i.e., synaptic inputs) a neuron can have is 16. Without this constraint, the nodes denoted by elements 1004 and 1010 preceding the LGMD cell 900 (left visual field) are not necessary. FIG. 11 is a detailed diagram of the LGMD cell model (left visual field) without the hardware constraint, using an 8×8 image size as a non-limiting example.

The Reichardt detector was used in Badia et al. (see Literature Reference No. 1). Their model is different from several embodiments of the present invention in several aspects. For instance, their model is not a spiking model, rather a non-spiking Reichardt detector is used. Additionally, the Badia et al. model uses two visual cameras. In contrast, the system according to some embodiments of the present invention uses only a single camera, which dramatically decreases computational costs.

Further, for each camera their model computes and then sums all directions. In some embodiments of the present invention, the visual field is first divided into four sub-fields. Then, only one corresponding motion direction in each sub-visual field is computed, and motion is subtracted at the same direction in the complementary visual field. As a result, the model according to some embodiments of the present invention can determine whether an object is approaching, receding or translating while the Badia et al. model cannot.

Figure 12:
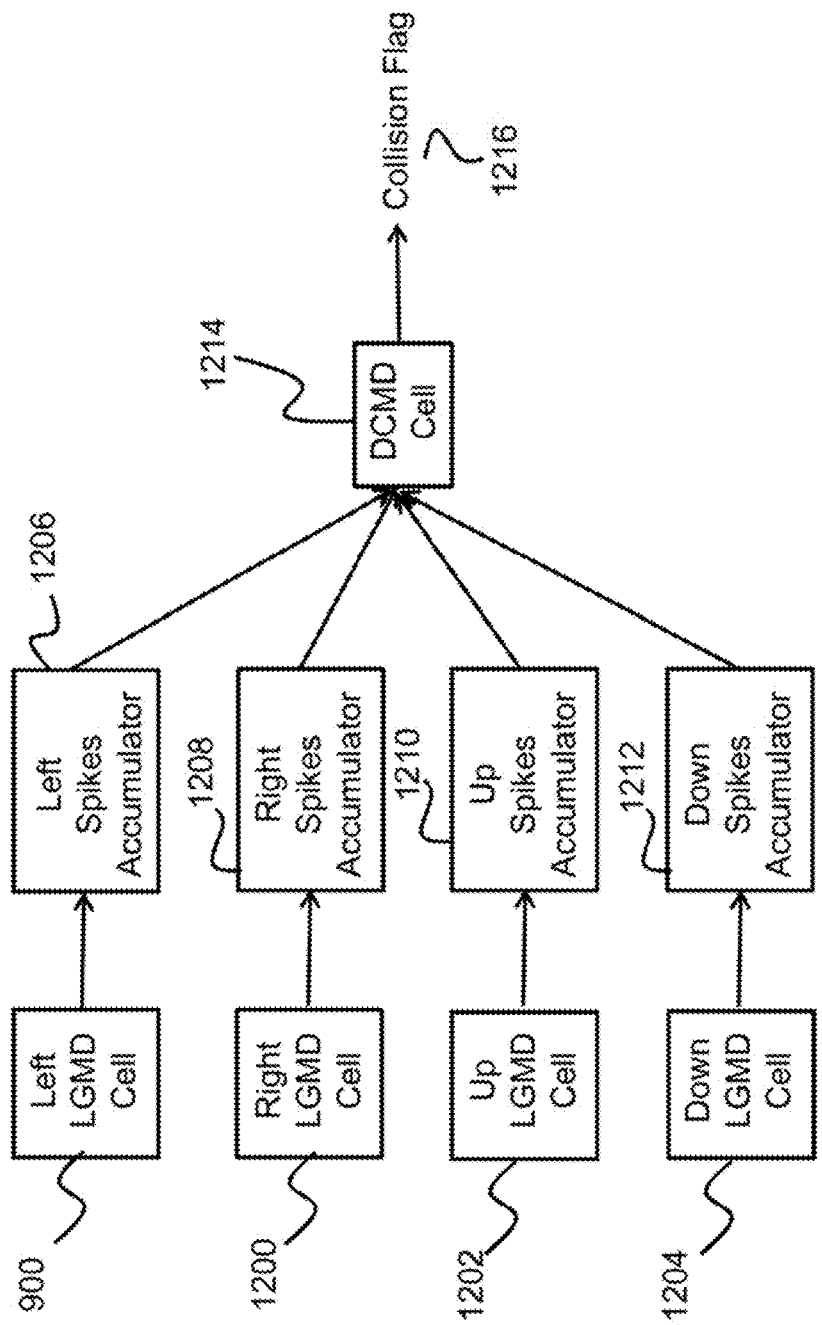
FIG. 12 is an illustration of a second part of the spiking collision detection model according to some embodiments of the present invention.

The system according to some embodiments of the present invention combines all four visual sub-fields to flag an impending collision, as depicted in FIG. 12. Here, four LGMD cells (left LGMD cell 900, right LGMD cell 1200, up LGMD cell 1202, and down LGMD cell 1204) are computed from their visual sub-fields. Spikes accumulators, including a left spikes accumulator 1206, a right spikes accumulator 1208, an up spikes accumulator 1210, and a down spikes accumulator 1212, accumulate spikes from the four LGMD cells 900, 1200, 1202, and 1204, respectively. They are all leaky integrate-and-fire neurons whose membrane potentials (V) are defined according to the following:

$$V(t) = L + V(t-1) + I(t), \quad (2)$$

$$\text{If } V(t) \geq \theta, \text{ spike and reset } V(t) = 0, \quad (3)$$

$$\text{If } V(t) < -\vartheta, \text{ reset } V(t) = -\vartheta. \quad (4)$$

Here, L is a leakage constant, and I(t) is the weighted sum of all inputs. Whenever its membrane potential V exceeds a threshold, the neuron fires and V is reset to zero (equation (2)). The membrane potential V is allowed to go below the resting state zero, but a lower bound ($\vartheta$) is added to prevent it from going too far below zero (equation (4)).

For spikes accumulators, L<0 is used. Here, L<0 play a role. Due to the energy leakage with L<0, the continuous slow firing of a LGMD cell (e.g., left LGMD cell 900) does not contribute much (leaked away) to the spikes accumulator (e.g., left spikes accumulator 1206) in contrast to the fast bursting of a LGMD cell (e.g., left LGMD cell 900). This is consistent with the observation in the simulations that a LGMD cell (e.g., left LGMD cell 900) can keep firing when an object is approaching, but it fires very fast when a collision is impending. Finally, the model DCMD (descending contralateral motion detector) cell 1214 sums all spikes accumulators (elements 1206, 1208, 1210, and 1212) and decides whether to generate a collision flag 1216. The model DCMD cell 1214 (which is described in Literature Reference No. 11) is inspired by the locust descending contralateral motion detector (DCMD), which is believed to signal impending collision. The DCMD cell 1214 has a similar spiking dynamics as the spikes accumulators (elements 1206, 1208, 1210, and 1212). However, it fires and flags an impending collision (i.e., collision flag 1216) when accumulated energy from all of the spikes accumulators (elements 1206, 1208, 1210, and 1212) exceeds a certain threshold.

Figure 13:
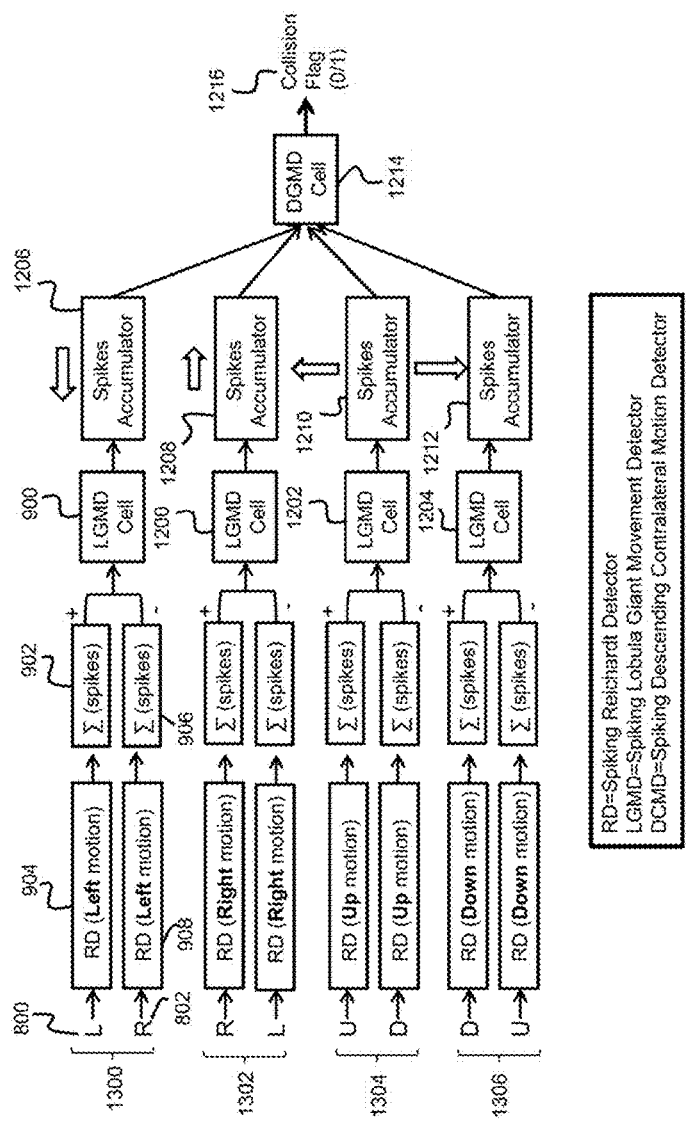
FIG. 13 is an illustration of the full spiking collision detection model according to some embodiments of the present invention.

FIG. 13 shows an overall diagram of the spiking collision detection model according to some embodiments of the present invention. The diagram illustrates the combination of the first part of the spiking collision detection model, which is shown in FIG. 9, and the second part of the spiking collision detection model (the DCMD cell model), which is shown in FIG. 12. As depicted in FIG. 13, for the detection of left motion 1300, the excitatory input to the model left LGMD cell 900 is all the spikes for edges moving left 902 that are the output of the spiking Reichardt detector for detecting left motion 904 on the left visual field 800. The inhibitory (negative) input is all the spikes for edges moving left 906 that are the output of the spiking Reichardt detector for detecting left motion 908 on the right visual field 802. The left spikes accumulator 1206 accumulates spikes from the model left LGMD cell 900 for detection of left motion 1300. The above is also true for the detection of right motion 1302, up motion 1304, and down motion 1306. As described in FIG. 12, the model DCMD cell 1214 sums all spikes accumulators (elements 1206, 1208, 1210, and 1212) and decides whether to generate a collision flag 1216.

(4.3) Experimental Studies (4.3.1) LGMD Cell

Figure 14:
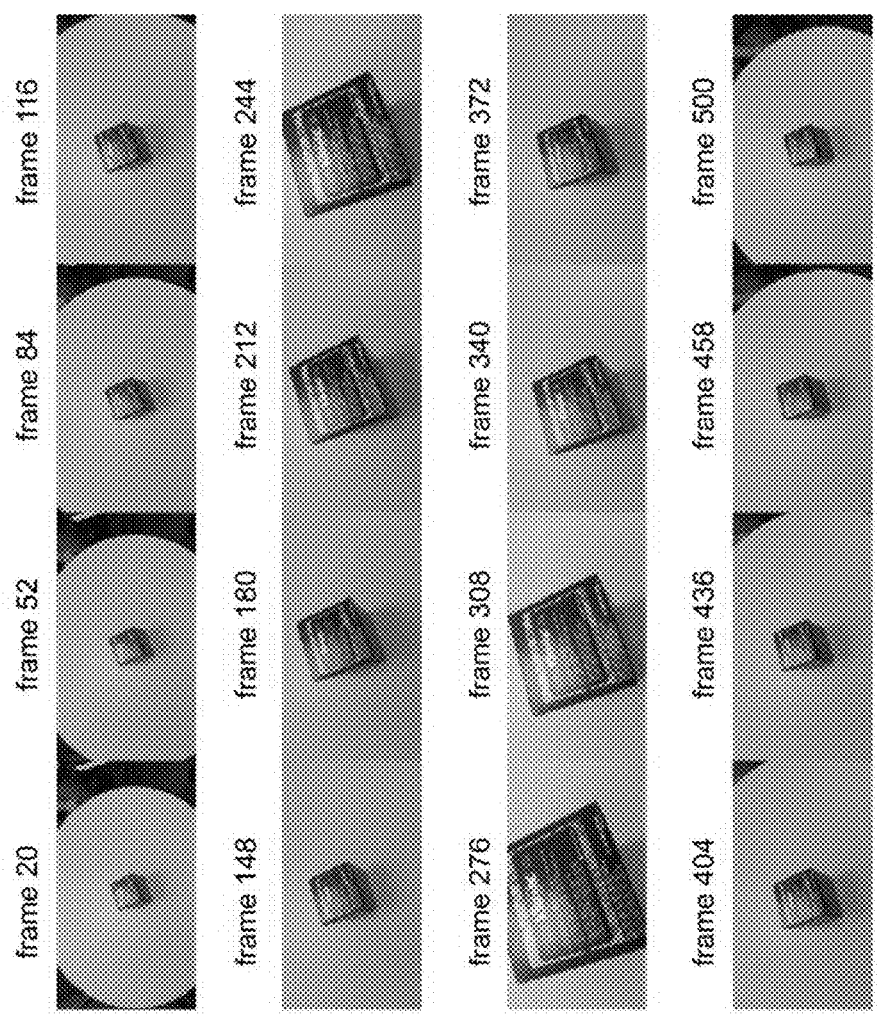
FIG. 14 is an illustration of a testing video of approaching and then receding from a box on a table according to some embodiments of the present invention.
Figure 15:
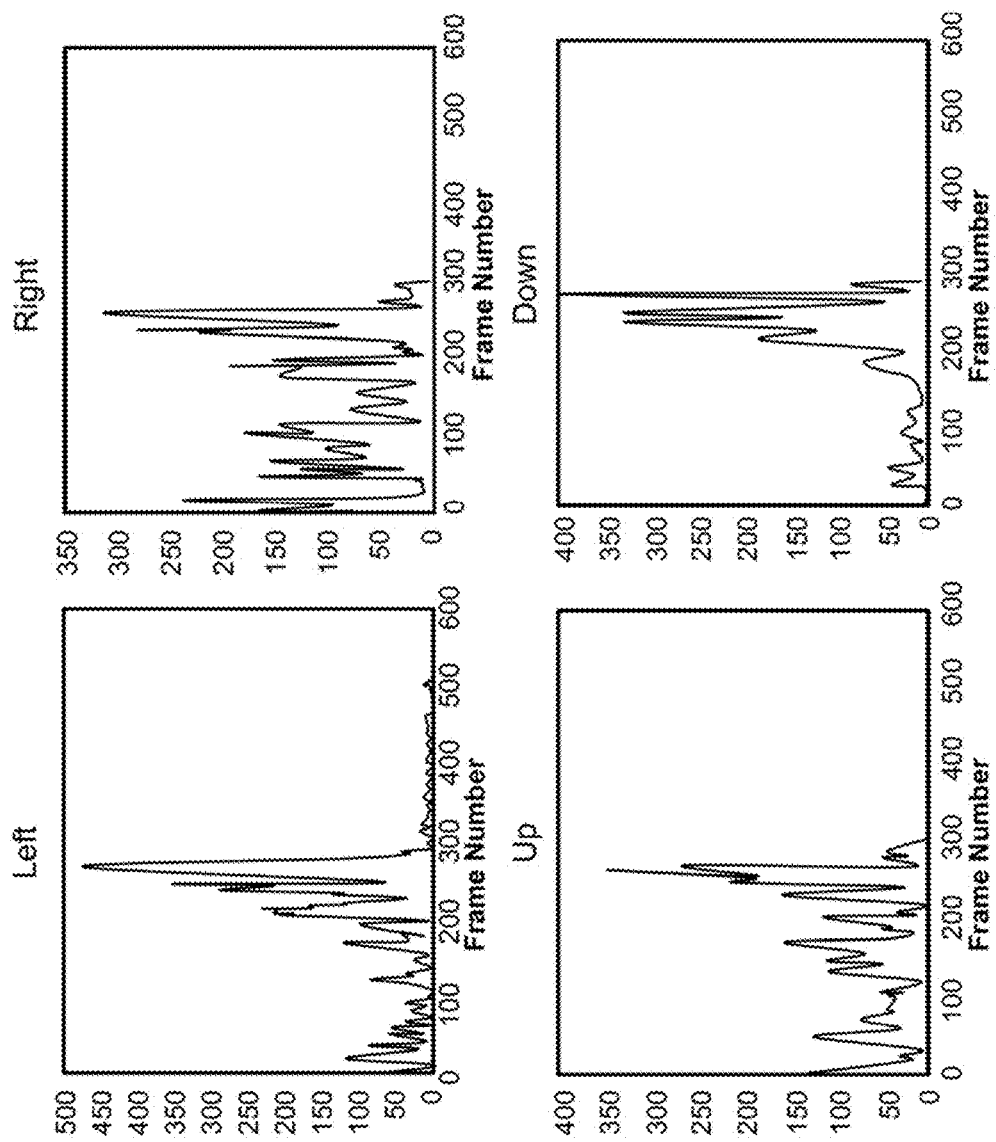
FIG. 15 is an illustration of inputs to four LGMD cells for the testing video of FIG. 14 according to some embodiments of the present invention.

The responses of the LGMD cells (e.g., 900, 1200, 1202, and 1204) were tested with various real videos. One of the videos tested was of a box on a table, as depicted in FIG. 14. The moving camera is first approaching the box (frame 20 through frame 244) and then receding away from the box (frame 276 to frame 500). FIG. 15 shows the summed inputs from spiking Reichardt detectors (e.g., 904 and 908) to four LGMD cells (e.g., 900, 1200, 1202, 1204) for the video depicted in FIG. 14, where the x-axis denotes frame number and the y-axis denotes the number of input spikes. It can be seen that the inputs reach their maximum values in all four directions (left, right, up, down) between frames 250 and 300 where a collision is impending. Additionally, when the object is receding (frames 276-500), there are almost no excitatory inputs to the LGMD cells. Further, in assessing the responses of four LGMD cells to the video depicted in FIG. 14, the LGMD cells keep responses when an object is approaching but they respond much more vigorously when a collision is impending. In the simulation, for LGMD cells, L=0, $\theta$=1000, and $\vartheta$=$\theta$ was chosen. The firing threshold $\theta$ is a parameter that depends on image size. Here, the image size was 240×135 pixels.

Figure 16:
FIG. 16 is an illustration of a testing video of approaching and then receding from an office printer according to some embodiments of the present invention.
Figure 17:
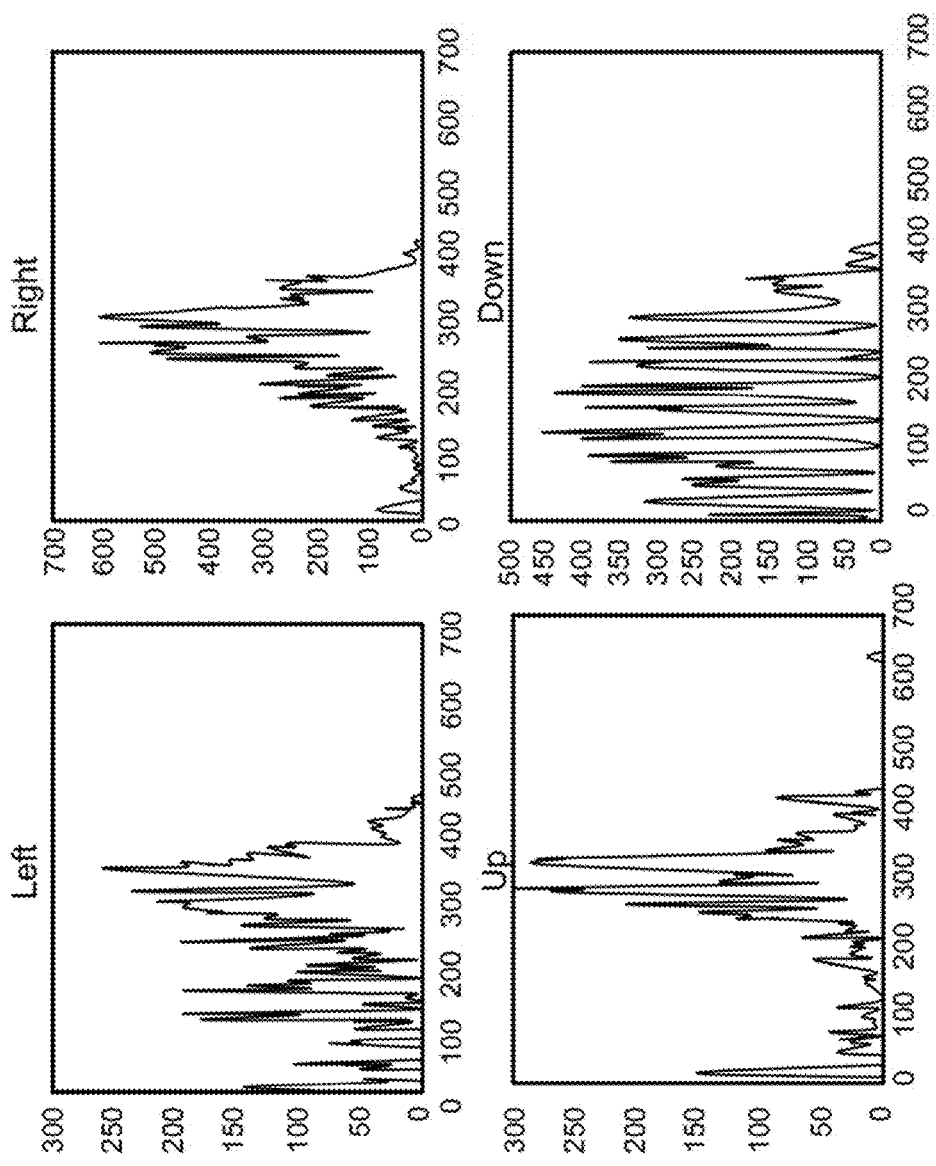
FIG. 17 is an illustration of inputs to four LGMD cells for the testing video of FIG. 16 according to some embodiments of the present invention.

In another video tested, shown in FIG. 16, a moving camera is first approaching an office printer (frame 40 through frame 340) in a real indoor environment and then receding away from it (frame 360 through frame 640). FIG. 17 shows the inputs to four LGMD cells for the video depicted in FIG. 16. Similar responses were seen to that of the simulation involving the box on the table.

(4.3.2) DCMD Cell

Figure 18:
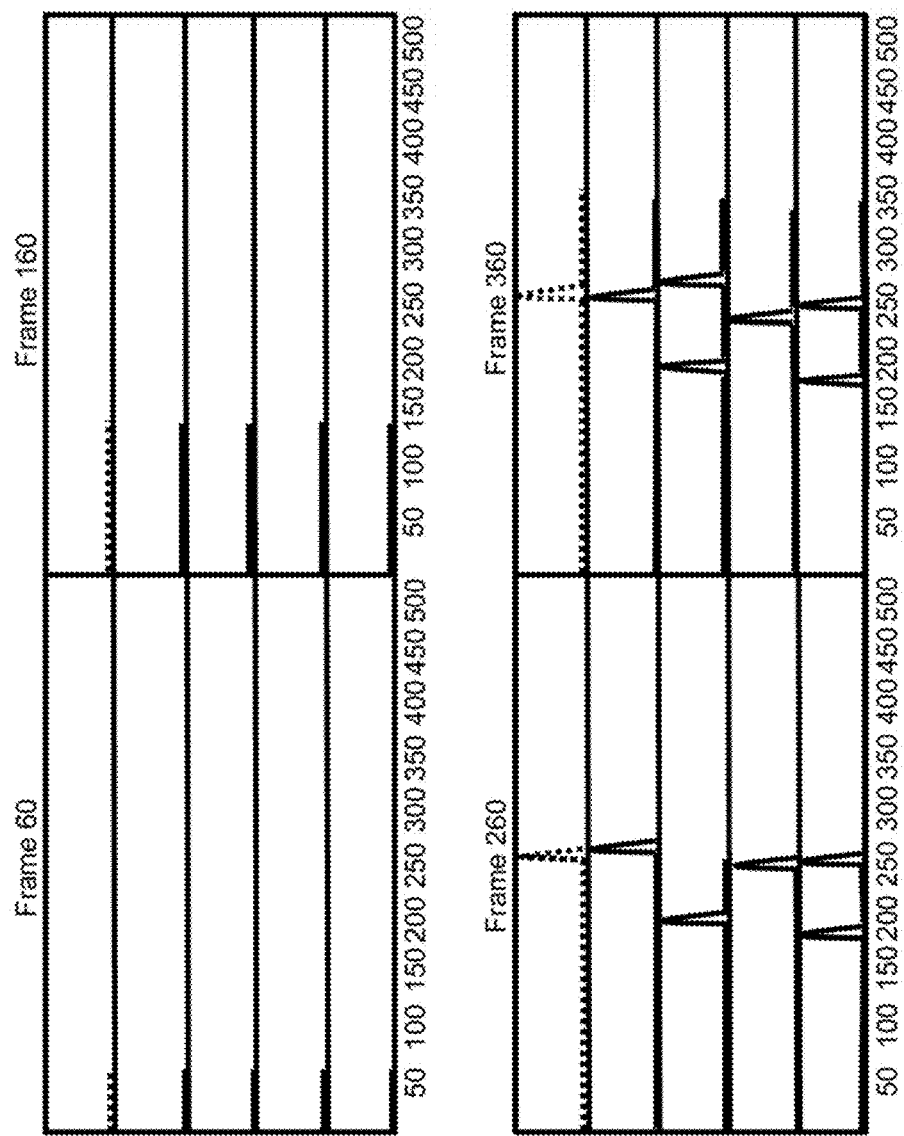
FIG. 18 is an illustration of the response of a descending contralateral motion detector (DCMD) cell to the testing video of FIG. 14.

The DCMD cell 1214 combines all responses from four LGMD cells (900, 1200, 1202, and 1204). FIG. 18 shows a real-time response of the DCMD cell 1214 to the box on the table video, depicted in FIG. 14. In each frame (frame 60, frame 160, frame 260, and frame 360), the top row is the response of the DCMD cell 1214 (dashed line). The DCMD cell 1214 spikes at about frame 260, which indicates a collision is impending. The second to fifth rows from the top are the responses of the spike accumulators (e.g., 1206, 1208, 1210, and 1212) (solid lines), in turn for up, down, left, and right visual fields, respectively. To facilitate real-time simulation in MATLAB, the image size was reduced to 34×34. Also, the delay was reduced from 10 time-steps to 5 time-steps, which implies each frame was computed only 5 time-steps.

Figure 19:
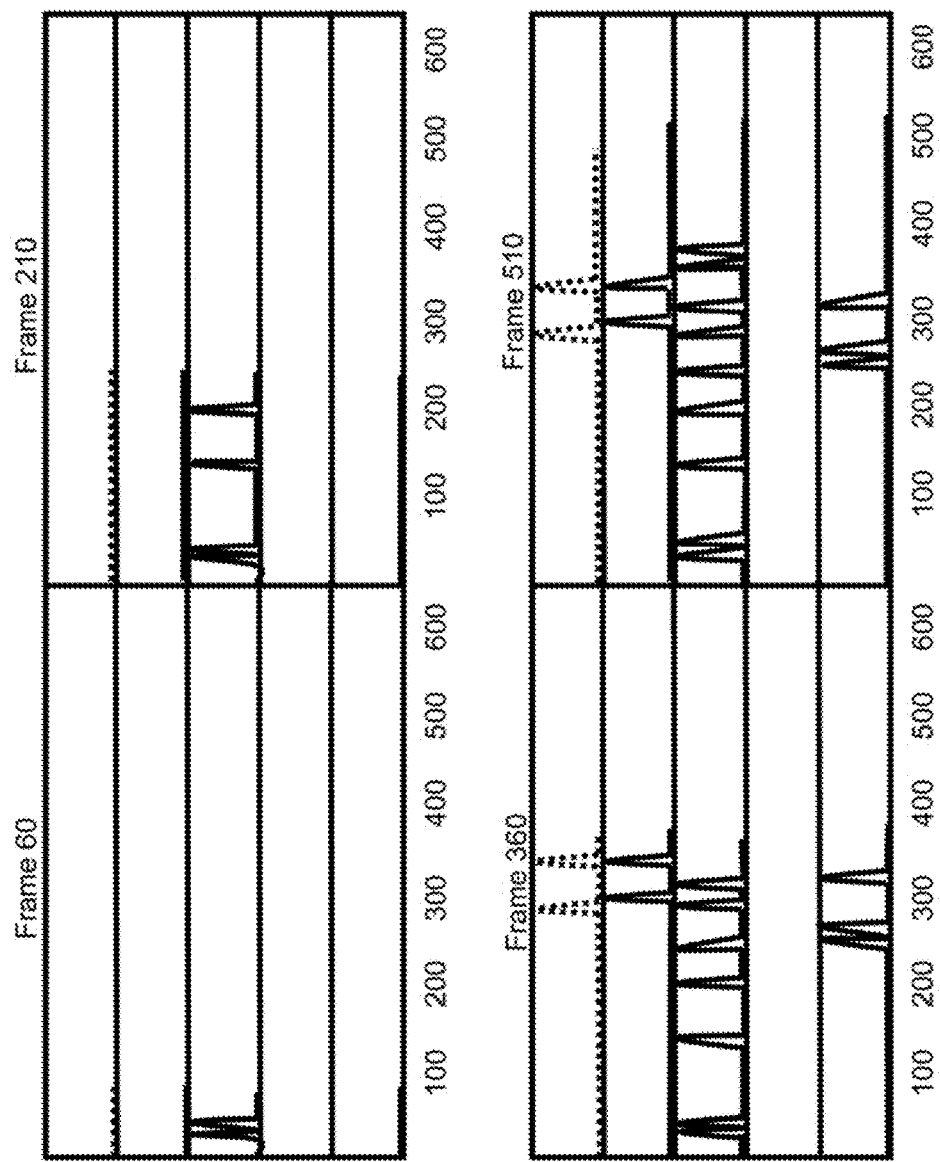
FIG. 19 is an illustration of the response of a DCMD cell to the testing video of FIG. 16.

FIG. 19 shows a real-time response of the DCMD cell 1214 to the printer in the office video, depicted in FIG. 16. The top row in each figure (dashed lines) indicates the final DCMD output of our system. A spike implies an impending collision. The second to fifth rows are LGMD outputs (solid lines) from the up, down, left, and right directions for each of the four fields, respectively. Table 3 shows parameters that were used in the simulation. The threshold for LGMD cells is 20 here. Much smaller image sizes were also tested. For instance, the spiking model according to some embodiments of the present invention can even work for an 8×8 image size.

TABLE 3

Parameters for DCMD Cell Simulations

| | Leakage (L) | Firing Threshold (θ) | Lower Threshold (θ) |
|---|---|---|---|
| Spikes Accumulator | −0.04 | 4 | 0 |
| DCMD Cell | −0.02 | 3 | 0 |

(4.3.3) Power Estimate of Spiking Collision Detection Method

Note that the spiking collision detection method according to some embodiments of the present invention uses two set of complimentary visual fields (i.e., four visual sub-fields). Each visual sub-filed needs two Reichardt motion detectors (RMDs). As described in section (4.1.4), it was estimated that one RMD consumes 6.3 nW power. Therefore, the spiking collision detection method described herein will consume 6.3×4×2=50.4 nW of power.

In summary, various embodiments include systems and methods for spiking collision/obstacle detection model that may use video from a single camera and may enable collision detection on small robots (such as micro UAVs or nano UAVs) for autonomous navigation. Its spiking neural network architecture can be readily implemented in emerging neuromorphic hardware with very low power consumption. Various embodiments can work with very low resolution images and can work in a real and cluttered environment.

What is claimed is:

1. A system for collision detection, the system comprising: one or more processors and a non-transitory computer-readable medium having executable instructions encoded thereon such that when executed, the one or more processors perform operations of: dividing an image in a sequence of images into a plurality of visual sub-fields comprising two sets of complementary visual sub-fields, each set comprising a first visual sub-field and a second visual sub-field that is complementary to the first visual sub-field, the sequence of images having been captured by a moving visual sensor; for each visual sub-field in the plurality of visual sub-fields, detecting motion in a direction corresponding to the visual sub-field using a first detector; for each visual sub-field in the plurality of visual sub-fields, detecting motion in a direction complementary to the visual sub-field using the first detector, wherein a first set of complementary visual sub-fields comprises a left visual sub-field and a right visual sub-field, and wherein a second set of complementary visual sub-fields comprises an up visual sub-field and a down visual sub-field;

using a plurality of Lobula Giant Movement Detector (LGMD) cell models, processing outputs of the first detector, each output comprising data corresponding to one direction of movement from two complementary visual sub-fields; accumulating spikes from the plurality of Lobula Giant Movement Detector (LGMD) cell models into corresponding spikes accumulators, each LGMD cell model corresponding to a visual sub-field;

combining the spikes of the spikes accumulators; and signaling an impending collision when the combination of the spikes of the spikes accumulators exceeds a predetermined threshold.

2. The system as set forth in claim 1, wherein for each set of complementary visual sub-fields, data corresponding to one of the first or the second visual sub-fields is used to inhibit data corresponding to the other of the first or the second visual sub-fields.

3. The system as set forth in claim 2, wherein the inhibition is performed by subtracting the data corresponding to one of the first or the second visual sub-fields from the data corresponding to the other of the first or the second visual sub-fields.

4. The system as set forth in claim 1, wherein a descending contralateral motion detector (DCMD) is used to sum the spikes of the spikes accumulators to signal the impending collision.

5. The system as set forth in claim 4, wherein the one or more processors further perform an operation of distinguishing whether an object in the image is approaching, receding, or translating.

6. The system as set forth in claim 5, wherein the first detector is a Reichardt detector.

7. The system as set forth in claim 6, wherein the Reichardt detector is a spiking detector.

8. The system as set forth in claim 1, further comprising an autonomous robot having a visual sensor for capturing the sequence of images in a direction of movement.

9. A computer-implemented method for collision detection, comprising: an act of causing one or more processors to execute instructions stored on a non-transitory memory such that upon execution, the one or more processors perform operations of: dividing an image in a sequence of images into a plurality of visual sub-fields comprising two sets of complementary visual sub-fields, each set comprising a first visual sub-field and a second visual sub-field that is complementary to the first visual sub-field, the sequence of images having been captured by a moving visual sensor; for each visual sub-field in the plurality of visual sub-fields, detecting motion in a direction corresponding to the visual sub-field using a first detector; for each visual sub-field in the plurality of visual sub-fields, detecting motion in a direction complementary to the visual sub-field using the first detector, wherein a first set of complementary visual sub-fields comprises a left visual sub-field and a right visual sub-field, and wherein a second set of complementary visual sub-fields comprises an up visual sub-field and a down visual sub-field; using a plurality of Lobula Giant Movement Detector (LGMD) cell models, processing outputs of the first detector, each output comprising data corresponding to one direction of movement from two complementary visual sub-fields; accumulating spikes from the plurality of Lobula Giant Movement Detector (LGMD) cell models into corresponding spikes accumulators, each LGMD cell model corresponding to a visual sub-field;

combining the spikes of the spikes accumulators; and signaling an impending collision when the combination of the spikes of the spikes accumulators exceeds a predetermined threshold.

10. The method as set forth in claim 9, wherein for each set of complementary visual sub-fields, data corresponding to one of the first or the second visual sub-fields is used to inhibit data corresponding to the other of the first or the second visual sub-fields.

11. The method as set forth in claim 10, wherein the inhibition is performed by subtracting the data corresponding to one of the first or the second visual sub-fields from the data corresponding to the other of the first or the second visual sub-fields.

12. A computer program product for collision detection, the computer program product comprising computer-readable instructions stored on a non-transitory computer-readable medium that are executable by a computer having one or more processors for causing the one or more processors to perform operations of: dividing an image in a sequence of images into a plurality of visual sub-fields comprising two sets of complementary visual sub-fields, each set comprising a first visual sub-field and a second visual sub-field that is complementary to the first visual sub-field, the sequence of images having been captured by a moving visual sensor; for each visual sub-field in the plurality of visual sub-fields, detecting motion in a direction corresponding to the visual sub-field using a first detector; for each visual sub-field in the plurality of visual sub-fields, detecting motion in a direction complementary to the visual sub-field using the first detector, wherein a first set of complementary visual sub-fields comprises a left visual sub-field and a right visual sub-field, and wherein a second set of complementary visual sub-fields comprises an up visual sub-field and a down visual sub-field; using a plurality of Lobula Giant Movement Detector (LGMD) cell models, processing outputs of the first detector, each output comprising data corresponding to one direction of movement from two complementary visual sub-fields; accumulating spikes from the plurality of Lobula Giant Movement Detector (LGMD) cell models into corresponding spikes accumulators, each LGMD cell model corresponding to a visual sub-field;

combining the spikes of the spikes accumulators; and signaling an impending collision when the combination of the spikes of the spikes accumulators exceeds a predetermined threshold.

13. The computer program product as set forth in claim 12, wherein for each set of complementary visual sub-fields, data corresponding to one of the first or the second visual sub-fields is used to inhibit data corresponding to the other of the first or the second visual sub-fields.

14. The computer program product as set forth in claim 13, wherein the inhibition is performed by subtracting the data corresponding to one of the first or the second visual sub-fields from the data corresponding to the other of the first or the second visual sub-fields.

* * * * *